(12) United States Patent
Sato

(10) Patent No.: US 7,766,541 B2
(45) Date of Patent: Aug. 3, 2010

(54) METHOD FOR DETECTING ABNORMALITY OF TEMPERATURE SENSOR IN MACHINE TOOL

(75) Inventor: Reiji Sato, Niwa-Gun (JP)

(73) Assignee: Okuma Corporation, Niwa-gun (JP)

( * ) Notice: Subject to any disclaimer, the term of this patent is extended or adjusted under 35 U.S.C. 154(b) by 64 days.

(21) Appl. No.: 11/950,561

(22) Filed: Dec. 5, 2007

(65) Prior Publication Data
US 2008/0144693 A1     Jun. 19, 2008

(30) Foreign Application Priority Data
Dec. 18, 2006   (JP)   .............................. 2006-340429

(51) Int. Cl.
*G01K 15/00*  (2006.01)
*G01K 3/00*   (2006.01)
*G01K 7/00*   (2006.01)
*G01K 13/00*  (2006.01)

(52) U.S. Cl. ........................ 374/1; 374/110; 374/166; 374/141; 374/112

(58) Field of Classification Search .................. 374/1, 374/110, 166, 141, 112
See application file for complete search history.

(56) References Cited

U.S. PATENT DOCUMENTS

| | | | |
|---|---|---|---|
| 6,286,992 B1 * | 9/2001 | Kyrtsos | 374/45 |
| 2004/0066831 A1 * | 4/2004 | Shivaswamy et al. | 374/55 |
| 2006/0247888 A1 * | 11/2006 | Kojima et al. | 702/130 |

FOREIGN PATENT DOCUMENTS

| | | |
|---|---|---|
| JP | 61-059860 B2 | 12/1986 |
| JP | 06-061674 B2 | 8/1994 |
| JP | 2001-341049 A1 | 12/2001 |

* cited by examiner

*Primary Examiner*—Gail Verbitsky
*Assistant Examiner*—Mirellys Jagan
(74) *Attorney, Agent, or Firm*—Burr & Brown

(57) ABSTRACT

The invention relates to a method for detecting an abnormality of a temperature sensor. A plurality of temperature sensors are preliminarily grouped for each of predetermined attachment areas of a machine tool, and after a temperature of each part is measured in S1, the detected temperatures are classified in S2 for each of the grouped attachment areas, and then sorted in descending order in S3. Subsequently, a difference ΔT between any closest two of the detected temperatures is obtained in S4, and then compared with a preset limit value γ in S5, when ΔT exceeds the limit value γ, temperature sensors in a corresponding attachment area are determined abnormal in S6, and an alarm is displayed.

8 Claims, 5 Drawing Sheets

[Fig. 1]
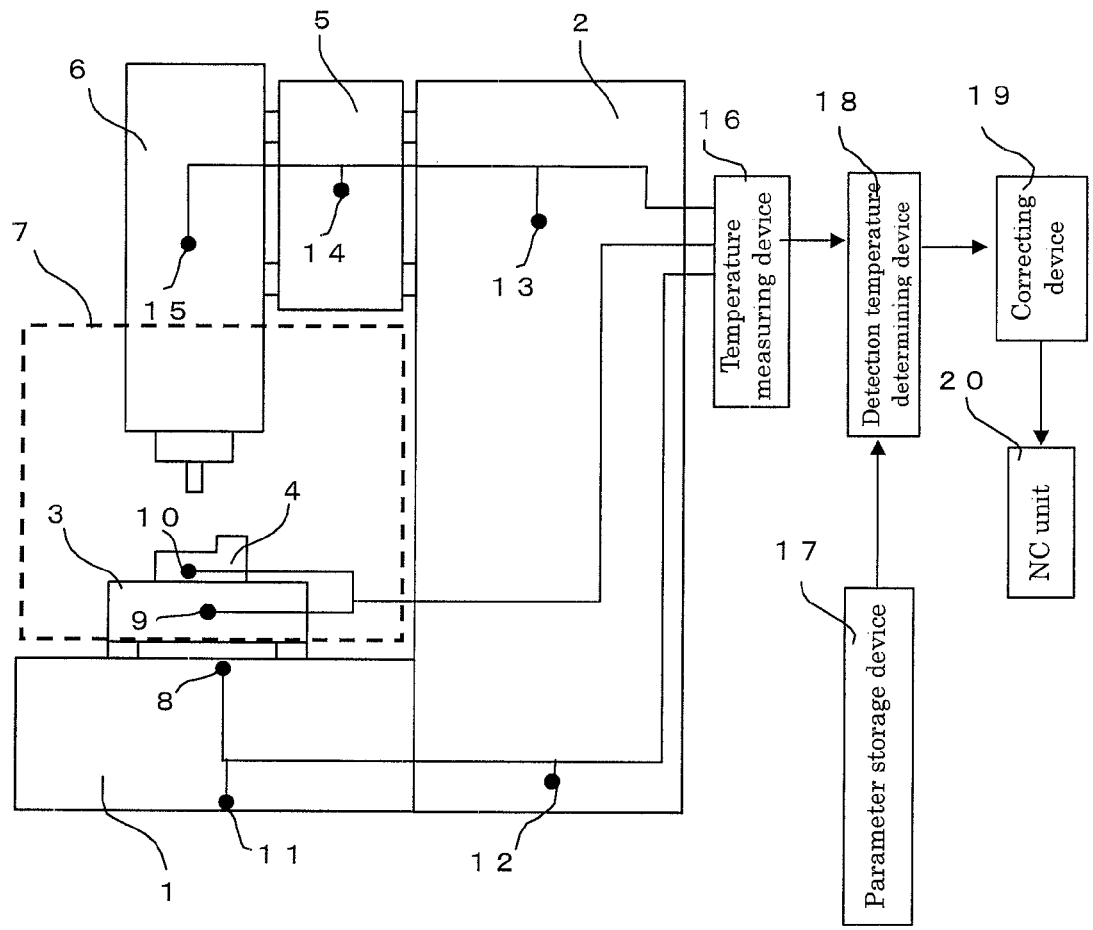

[Fig. 2]
Variations of detected temperatures by temperature sensors in classification B (for case of room temperature and cutting fluid temperature variations in Fig. 5)
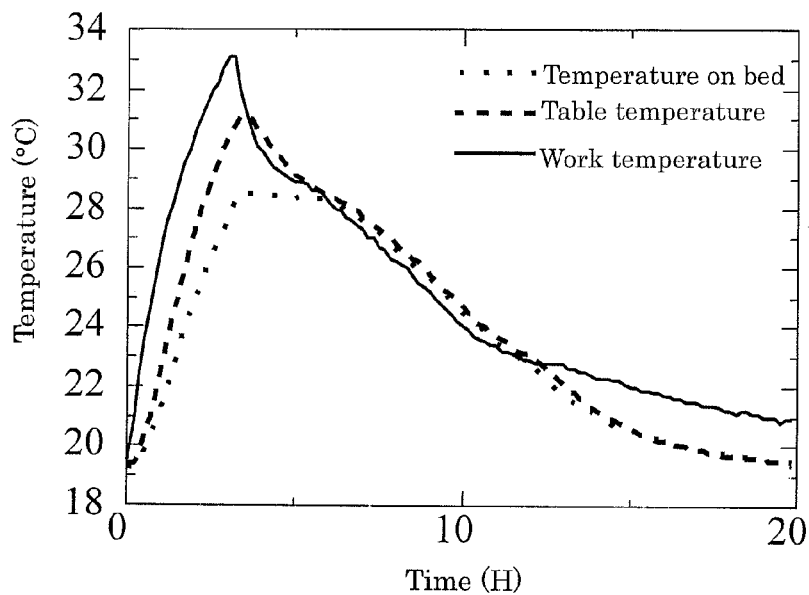
[Fig. 3]
Variations of detected temperatures by temperature sensors in classification C (for case of room temperature and cutting fluid temperature variations in Fig. 5)
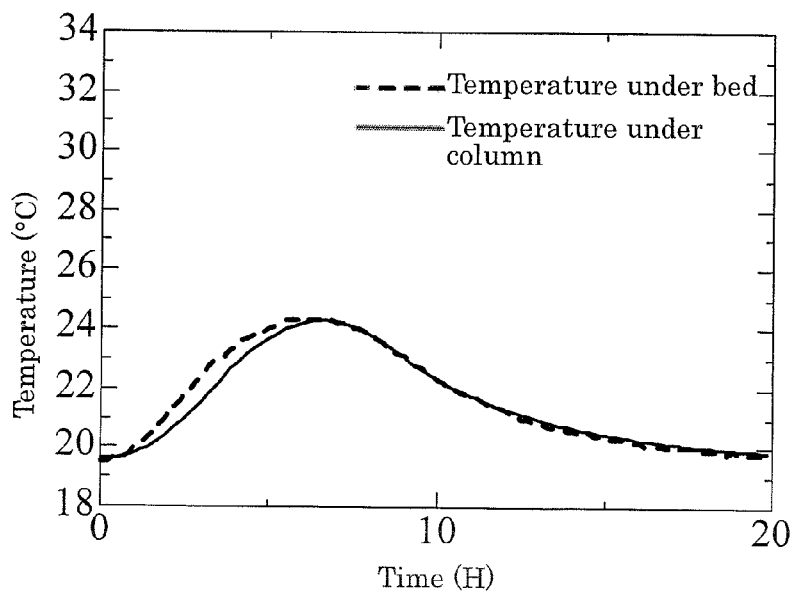

[Fig. 4]
Variations of detected temperatures by temperature sensors in classification D (for case of room temperature and cutting fluid temperature variations in Fig. 5)
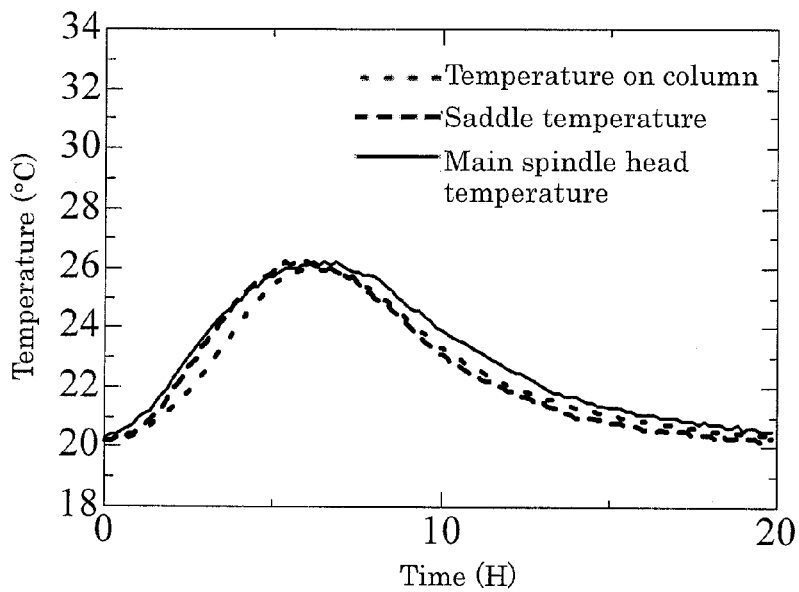
[Fig. 5]
Room temperature and cutting fluid temperature variations
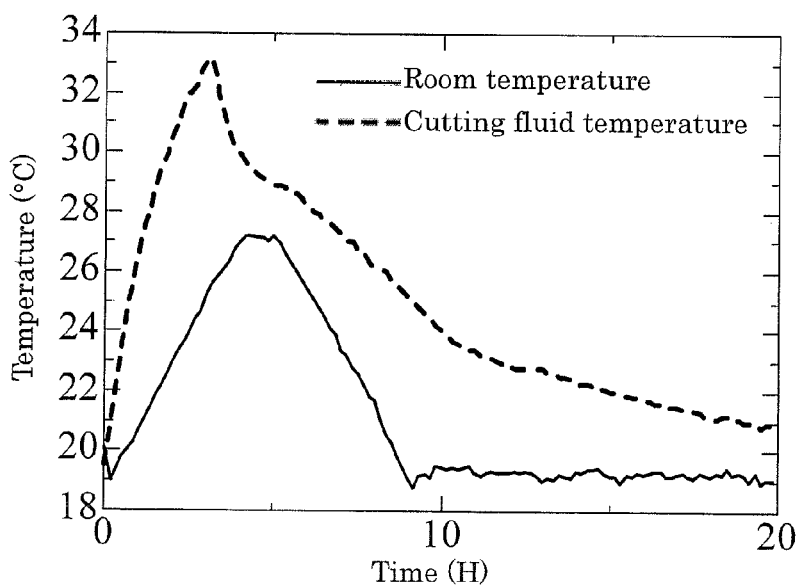

[Fig.6]
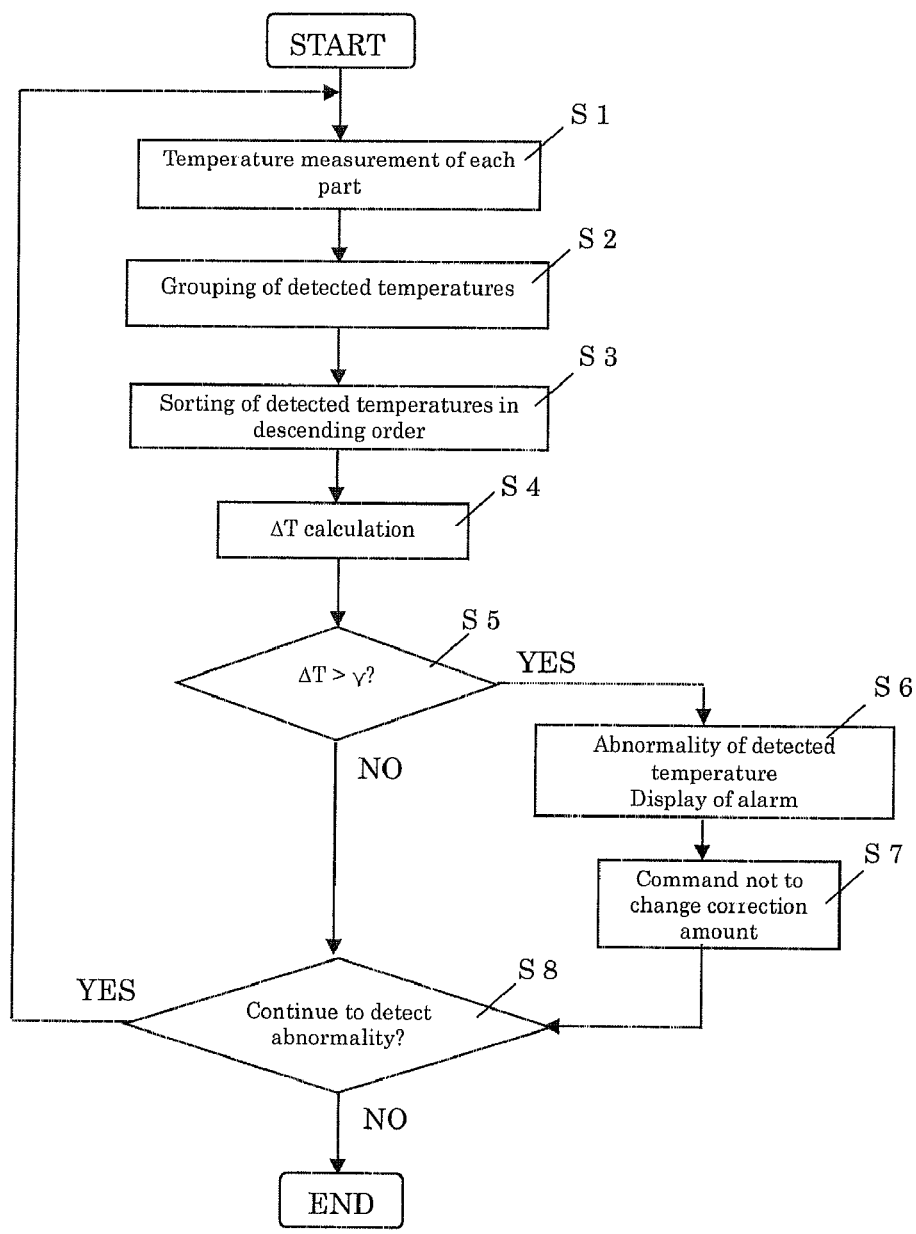

[Fig.7]
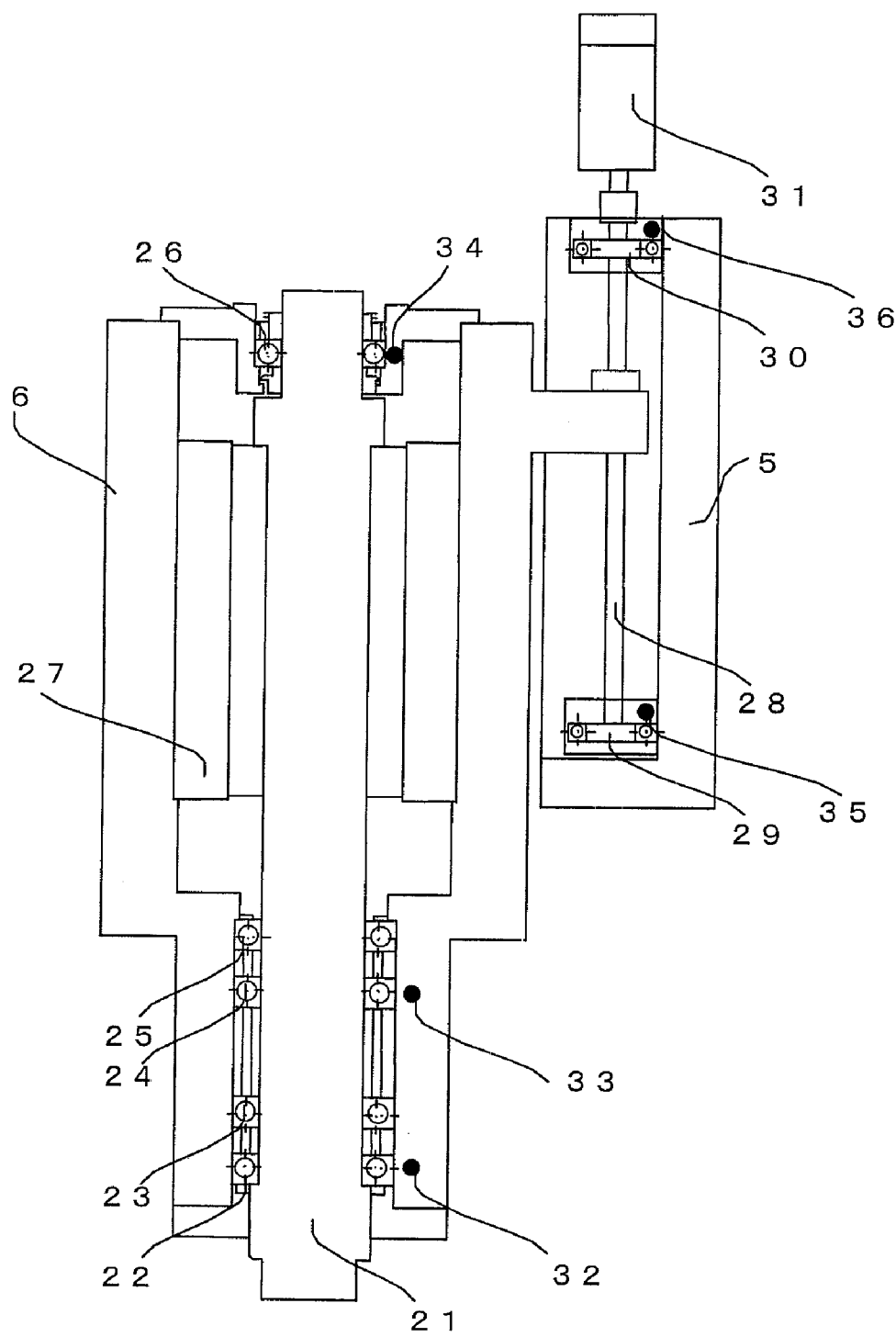

METHOD FOR DETECTING ABNORMALITY OF TEMPERATURE SENSOR IN MACHINE TOOL

This application claims the benefit of Japanese Patent Application Number 2006-340429 filed on Dec. 18, 2006 the entirety of which is incorporated by reference.

FIELD OF THE INVENTION

The present invention relates to a method for detecting an abnormality of a temperature sensor used for correcting thermal displacement of a machine tool.

BACKGROUND OF THE INVENTION

In a machine tool, a thermal displacement correcting method for correcting a machining dimensional error caused by surrounding room temperature variation or cutting heat is often used. The method is configured such that a temperature sensor such as a thermocouple or thermistor is provided on each of components of the machine tool, temperature information from the temperature sensor is obtained by means of use of a temperature measuring device such as a voltmeter or ammeter, a thermal displacement amount is estimated from the obtained temperature information to calculate a correction amount for a moving body such as a main spindle or tool rest, and the moving body is controlled based on the correction amount (see Patent documents 1 to 3).

[Patent document 1] Japanese Patent Publication No. 1986-59860

[Patent document 2] Japanese Patent Publication No. 1994-61674

[Patent document 3] Japanese Unexamined Patent Publication No. 2001-341049

SUMMARY OF THE INVENTION

In the above mentioned conventional case, when an abnormal temperature is detected due to disconnection or short circuit in the temperature sensor, or failure of the temperature measuring device is detected, a normal correction may not be performed and the machining dimensional error may increase. Further, the moving body of the machine may collide with a workpiece due to an abnormal correction amount, so that the abnormality of the temperature sensor needs to be detected. The abnormality of the temperature sensor, such as disconnection or short circuit, can be easily detected by monitoring the temperature information from each of the temperature sensors. On the other hand, for example, the abnormality or the like due to aged deterioration of the thermistor cannot be detected solely by the temperature sensor or temperature measuring device. Therefore, there has been employed a method in which, for example, a plurality of temperature sensors are arranged at the same place, and the abnormality is detected by comparing a plurality of pieces of temperature information with one another. For this reason, the number of temperature sensors or temperature measuring devices increases, resulting in an increase in cost.

An object of the present invention is to provide a method capable of more simply detecting the abnormality of the temperature sensor.

In order to accomplish the above object, a first aspect of the present invention includes the steps of: preliminarily grouping temperature sensors into one or a plurality of predetermined attachment areas of a machine tool; respectively obtaining variations of the detected temperatures by the plurality of temperature sensors in the attached areas; comparing each of the variations with a corresponding preset limit value; and when the each of the variations exceeds the limit value, determining the temperature sensors associated with the each of the variations to be abnormal.

A second aspect of the present invention is, in addition to an object of the first aspect, configured such that in order to enable abnormality detection to be promptly determined, the each of the variations of the detected temperatures is made equal to a difference between detected temperatures closest to each other when the detected temperature measured by sensors in the same attachment area are sorted in descending or ascending order.

A third aspect of the present invention is, in addition to the object of the first aspect or the second aspect, configured such that the attachment areas of the temperature sensors are divided into four areas: the first area is affected by heat sources such as bearings and motors and further divided to each of the heat sources; the second area that is in or faces to a machining space and is not affected by the heat sources; and the third and fourth areas that are not in or does not face to the machining space and are not affected by the heat sources. These areas are divided based on a height from a floor surface and abnormalities of the temperature sensors in the each area are detected, when temperature sensors are in each of the classified areas.

A fourth aspect of the present invention is, in addition to the object of any of the first aspect 1 to the third aspect 3, configured to include the step of: prohibiting any changes of correction amount in thermal displacement correction of the machine tool when a certain temperature sensor is determined abnormal. With this configuration, a failure due to an abnormal correction amount during machining is prevented.

According to the present invention, a detection of abnormality of the detected temperature is simply performed without extra time. As a result, it is not necessary to increase the number of temperature sensors or temperature measuring devices for detecting the abnormality, resulting in reduction of the cost.

The invention according to the second aspect enables the limit value for the difference in detection temperature used for the abnormality determination to be simply set regardless of the number of temperature sensors and set equal to a required minimum value, in addition to the effect of the first aspect. Accordingly, the abnormality detection can be determined promptly.

According to the third aspect of the present invention, in addition to the effects of the first aspect or the second aspect, the temperature sensors can be easily identified without reviewing detected temperatures of respective parts, as the temperature sensors are grouped based on the different attachment areas that are distinguishable based on whether the areas are affected by the heat sources and the height from a floor surface.

According to the fourth aspect of the present invention failures such as a collision of a moving body of the machine with a workpiece or the like, due to the abnormal correction amount, is prevented in addition to the effects of any of the first to the third aspects.

BRIEF DESCRIPTION OF THE DRAWINGS

FIG. 1 is a schematic diagram of a vertical machining center;

FIG. 2 is a graph illustrating variations of detected temperatures by temperature sensors in the classification B;

FIG. 3 is a graph illustrating variations of detected temperatures by temperature sensors in the classification C;

FIG. 4 is a graph illustrating variations of detected temperatures by temperature sensors in the classification D;

FIG. 5 is a graph illustrating variations of room temperature and cutting fluid temperature;

FIG. 6 is a flowchart illustrating a method for detecting an abnormality of a temperature sensor; and FIG. 7 is a schematic diagram illustrating structures of the main spindle inside the main spindle head and a vertically moving shaft inside the saddle in the vertical machining center illustrated in FIG. 1.

DETAILED DESCRIPTION OF THE INVENTION

An embodiment of the present invention will hereinafter be described based on the drawings.

FIG. 1 is a schematic diagram of a vertical machining center as one example of a machine tool as viewed from its side. On a right-hand side of a bed 1, a column 2 is securely installed. Further on a rail provided on an upper surface of the bed 1, a table 3 is placed movably in a horizontal (right-and left) direction of the diagram and a work 4 can be fixed on an upper surface of the table 3. On a rail provided on a left-hand side surface of the column 2, a saddle 5 is constructed movably in a direction perpendicular to the drawing, and on a left-hand side surface of the saddle 5, a main spindle head 6 is constructed movably in a vertical (up-and down) direction of the drawing.

Further, a dashed line 7 represents a machining space enclosed by a cover. In the machining space 7, cutting fluid is discharged from an unshown nozzle provided on a main spindle at the bottom of the main spindle head 6, then flows with chips along an unshown gutter part on the upper surface of the bed 1 after being poured into the table 3 and work 4, and discharged outside.

Reference numerals 8 to 15 represent temperature sensors the temperature sensor 8 is attached to the upper surface of the bed 1 to measure a temperature of the upper surface of the bed 1, the temperature sensor 9 is attached to the table 3 to measure a temperature of the table 3, the temperature sensor 10 is attached to the work 4 to measure a temperature of the work 4, the temperature sensor 11 is attached to a lower part of the bed 1 to measure a temperature of the lower part of the bed 1, the temperature sensor 12 is attached to a lower part of the column 2 to measure a temperature of the lower part of the column 2, the temperature sensor 13 is attached to an upper part of the column 2 to measure the upper part of the column 2, the temperature sensor 14 is attached to the saddle 5 to measure a temperature of the saddle 5, and the temperature sensor 15 is attached to the main spindle head 6 to measure a temperature of the main spindle head 6, respectively.

Temperature detection signals of the respective temperature sensors 8 to 15 are input to a temperature measuring device 16, and digitalized from the respective analog signals to temperature values. Reference numeral 17 represents a parameter storage device, in which classifying information associated with grouping which is preliminarily set based on an attachment position of each temperature sensor, and a limit value for each classification are respectively set. A detection temperature determining device 18 classifies the detected temperatures obtained from the temperature measuring device 16, based on the classifying information in the parameter storage device 17, and compares them with the limit values corresponding to the respective classifications to determine abnormalities of the temperature sensors and outputs the determination results to a correcting device 19. The correcting device 19 calculates correction values based on the detected temperatures obtained from the detection temperature determining device 18, and outputs them to an NC unit 20. The NC unit 20 will change feed commands for the table, main spindle head, and the like in accordance with the obtained correction values.

In the parameter storage device 17, the respective temperature sensors are configured to be provided in the following four attachment areas based on attachment positions at which temperatures vary in a similar manner:

A: Positions affected by respective heat sources such as bearings and motors (first area), B: Positions that are not affected by the heat sources but face an inside of the machining space or a machining space affected by cutting a fluid temperature (second area), C: Positions that are affected by neither the heat sources nor the cutting fluid temperature, and relatively close to a floor surface, where room temperature variation is small (third area), and D: Positions that are affected by neither the heat sources nor the cutting fluid temperature and far from the floor surface, where room temperature variation is large (fourth area).

Accordingly, application of the above classifying scheme to the temperature sensors 8 to 15 results in the following: there is no temperature sensor attached under the above condition A; the temperature sensors 8 to 10 are classified into B; the temperature sensors 11 and 12 are classified into C; the temperature sensors 13 to 15 are classified into D.

In the temperature sensors classified based on the conditions of B to D, the detected temperature at the time of changing of room temperature and cutting fluid temperature shown in FIG. 5 varies as illustrated in FIGS. 2 to 4. In other words, the detected temperature in the same classification varies in a similar manner.

The limit values $\gamma 2$, $\gamma 3$, and $\gamma 4$, which respectively correspond to the classifications B, C, and D, are set in the parameter storage device 17.

A method for detecting abnormalities of the temperature sensors in a vertical machining center, configured as above, is described based on a flowchart illustrated in FIG. 6.

Firstly, temperature measurements are performed with the respective temperature sensors 8 to 15, and obtained detection signals are digitalized by the temperature measuring device 16 to obtain temperature values (S1). This process is performed at preset intervals (e.g., every 10 seconds). Then, in S2, the detected temperatures are grouped into the following three classifications by the detection temperature determining device 18 based on the classifying information stored in the parameter storage device 17:

Classification B: Detected temperatures by temperature sensors 8, 9 and 10,

Classification C: Detected temperatures by temperature sensors 11 and 12, and

Classification D: Detected temperatures by temperature sensors 13, 14, and 15.

Subsequently, in S3, the detected temperatures in each of the classifications are sorted in descending order, and in S4, a difference $\Delta T$ between any closest two detected temperatures is calculated. For example, the detected temperatures $T_8$ to $T_{15}$ by the temperature sensors 8 to 15 at the time point of 2H in FIGS. 2 to 4 are as follows:

$T_8$=25.0° C., $T_9$=27.3° C., $T_{10}$=29.6° C., $T_{11}$=21.2° C., $T_{12}$=20.5° C., $T_{13}$=21.3° C., $T_{14}$=21.9° C., and $T_{15}$=22.3° C.

Accordingly, sorting the detected temperatures in the classification B, i.e., $T_8$, $T_9$, and $T_{10}$, in descending order results in the following $TB_1$, $TB_2$, and $TB_3$:

$TB_1=T_{10}=29.6°$ C.,
$TB_2=T_9=27.3°$ C., and
$TB_3T_8=25.0°$ C.

Respective detected temperature differences $\Delta Ts$ representing variations of the detected temperatures are as follows:
$\Delta TB_{(1-2)}=TB_1-TB_2=2.3°$ C., and
$\Delta TB_{(2-3)}=TB_2-TB_3=2.3°$ C.

Similarly, sorting the detected temperatures in the classification C, i.e., $T_{11}$ and $T_{12}$, in descending order results in the following $TC_1$ and $TC_2$:
$TC_1=T_{11}=21.2°$ C., and
$TC_2=T_{12}=20.5°$ C.

The detected temperature difference $\Delta T$ is as follows:
$\Delta TC_{(1-2)}=TC_1-TC_2=0.7°$ C.

Further, sorting the detected temperatures in the classification D, i.e., $T_{13}$, $T_{14}$, and $T_{15}$, in descending order results in the following $TD_1$, $TD_2$, and $TD_3$:
$TD_1=T_{15}=22.3°$ C.,
$TD_2=T_{14}=21.9°$ C., and
$TD_3=T_{13}=21.3°$ C.

The respective detected temperature differences $\Delta Ts$ are as follows:
$\Delta TD_{(1-2)}=TD_1-TD_2=0.4°$ C., and
$\Delta TD_{(2-3)}=TD_2-TD_3=0.6°$ C.

Subsequently, in S5, the temperature differences $\Delta TB$, $\Delta TC$, and $\Delta TD$ in the classifications B, C, and D are compared with the limited values $\gamma 2$, $\gamma 3$, and $\gamma 4$, respectively, when $\Delta T$ is larger than $\gamma(\Delta T>\gamma)$, either of two temperature sensors associated with a corresponding one of the detected temperature differences is determined abnormal. Then, when determination is made, an alarm representing the abnormality of the detected temperature by the temperature sensor is displayed in S6. In S7, a command is issued to the correcting device 19 not to change a correction amount set before the abnormality occurs. On the other hand, when it is determined that the condition of $\Delta T>\gamma$ is not met in S5, or after the issuance of the command in S7, it is determined S5 in S8 whether or not the abnormality detection is continuously performed, and if it is determined to continue, the flow returns to S1.

As described above, according to the method for detecting an abnormality of a temperature sensor, the abnormality detected of the detection temperature can be simply performed without taking extra time, by performing the steps of: preliminarily grouping the temperature sensors for each of the predetermined attachment areas; obtaining a variation in detected temperature among the plurality of temperature sensors belonging to each of the attachment areas; comparing the variation with the corresponding preset limit value; and when the variation exceeds the limit value, determining a temperature sensor in the attachment area associated with the variation to be abnormal. Accordingly, it is not necessary to increase the number of temperature sensors or temperature measuring devices for the abnormality detection, resulting in suppression of cost increase.

In particular, as the temperature sensors are grouped based on the different attachment areas that are distinguishable based on whether the areas are affected by the heat sources or cutting fluid temperature and the height from a floor surface, the temperature sensors can be easily classified without measuring the detected temperatures of the respective parts.

Further, when any of the temperature sensors is determined abnormal, any change of the correction amount in thermal displacement correction is prohibited. As a result, a failure due to an abnormal correction amount, such as a collision of a moving body of the machine with a workpiece or the like, can be prevented.

Further, the variation in detected temperature is set equal to the difference between the detected temperatures closest to each other when the plurality of temperature sensors in the same attachment area are sorted in descending or ascending order. Consequently, the limit value corresponding to the detected temperature difference, which is used for the abnormality determination, can be simply set, regardless of the number of temperature sensors. Further, the limit value can be set equal to a required minimum value and the abnormality detection can be determined promptly. This is because that the abnormality of the detected temperature due to deterioration or the like of the corresponding temperature sensor occurs at one position in many cases, so that even if the limit value to be used is set as small as possible, and set the same value regardless of the total number of the temperature sensors, the abnormality can be detected in the attachment area.

In addition, as a method for obtaining the variation between the classified temperature sensors, a statistic such as a standard deviation, median, or range can also be used. When the standard deviation or range is used, the standard deviation or range will be obtained from the classified detected temperatures with a publicly-known expression, and then compared with a preset limit value.

When the median is used, the median will be obtained from the classified detected temperatures with a publicly-known expression, and then a difference between the median and each of the detected temperatures will be compared with a preset limit value.

It should be noted, however, that the standard deviation takes a different value depending on the total number of samples, so that the limit value to be compared with the standard deviation should be preferably varied depending on the total number of the classified temperature sensors. Further, among the classified temperature sensors, the detected temperature varies depending on the temperature sensor position as illustrated in FIGS. 2, 3, and 4. Thus, the limit values to be compared with the range and the difference between the median and each of the detected temperatures should be preferably varied depending on the total number of the temperature sensors, or on the attachment positions of the temperature sensors in the same classification.

The above embodiment describes the case of the classifications B to D which are not affected by the heat sources among the four classified attachment areas. However, when temperature sensors are classified for each of the heat sources in the classification A that is affected by the heat sources, the classifying is made, for example, in the following manner.

FIG. 7 is a schematic diagram illustrating structures of the main spindle inside the main spindle head 6 and a vertically moving shaft inside the saddle 5 in the vertical machining center illustrated in FIG. 1. The main spindle 21 is pivotally supported by bearings 22 to 26, and driven by a motor 27. The main spindle head 6 is moved in the vertical direction by a ball screw 28. The ball screw 28 is pivotally supported by bearings 29 and 30, and driven by a motor 31.

Temperature sensors 32 to 34 are respectively attached near the bearings 22, 24, and 26 pivotally supporting the main spindle 21 in order to measure temperatures of the respective bearings 22, 24, and 26. Temperature sensors 35 and 36 near the bearings 29 and 30 pivotally supporting the ball screw 28 in order to measure temperatures of the respective bearings 29 and 30.

Since the bearings 22, 24, and 26 pivotally supporting the main spindle 21 produce heat when the main spindle 21 rotates, the bearings 22, 24 and 26 can be treated as heat sources, respectively. In other words, the temperature sensors 32 to 34 can be classified into one attachment area (classification A in the above embodiment, and the first area in the present invention).

On the other hand, when the main spindle head 6 vertically moves, the bearings 29 and 30 pivotally supporting the ball screw 28 rotate and produce heat. Therefore the bearings 29 and 30 can also be treated as heat sources, respectively. Thus, the temperature sensors 35 and 36 can also be classified into one attachment area (classification A, the first area).

In the above-described manner, the classifying is performed on a heat source basis. A subsequent process for detecting an abnormality of a temperature sensor in each of the classifications is the same as that of the above embodiment.

The other mode, or the like, including the number, attachment positions, and grouping of the temperature sensors is not limited to the above embodiment, but may be appropriately changed. For example, the areas classified based on a height from the floor surface are further classified into three or more stages. However, the number of attachment areas is not required to be more than one, but may be one. It should also be appreciated that an applicable machine tool is not limited to the machine center and the present invention can be applied to any machine in which thermal displacement correction is performed with use of temperature sensors.

What is claimed is:

1. A method for detecting abnormalities of a temperature sensor in a machine tool in which a plurality of temperature sensors are arranged at different parts of the machine tool, the method comprising the steps of:
    preliminarily grouping the temperature sensors into one or a plurality of predetermined attachment areas of the machine tool at which temperatures vary in a similar manner;
    setting a limit value of variations of detected temperatures of each group of the plurality of temperature sensors belonging to the same group in the predetermined attachment areas;
    detecting temperatures of each part of the machine tool by the plurality of sensors;
    grouping the detected plurality of temperatures in accordance with the corresponding group of temperature sensors;
    obtaining variations of the detected temperatures in the same temperature group, respectively;
    comparing each of the variations with a corresponding preset limit value of each group, respectively; and
    determining the temperature sensors associated with the variation to be abnormal when one of the variations exceeds the limit value.

2. A method for detecting abnormalities of a temperature sensor in a machine tool in which a plurality of temperature sensors are arranged at different positions, the method comprising the steps of:
    preliminarily grouping the temperature sensors into one or a plurality of predetermined attachment areas of the machine tool;
    respectively obtaining variations of detected temperatures by the plurality of temperature sensors belonging to the attachment areas;
    comparing each of the variations with a corresponding preset limit value; and
    determining the temperature sensors associated with the variation to be abnormal when one of the variations exceeds the limit value,
    said method further comprising a step of: prohibiting a correction of machining dimensional errors from being changed in thermal displacement correction of the machine tool, when the temperature sensors are determined abnormal.

3. A method for detecting abnormalities of a temperature sensor in a machine tool in which a plurality of temperature sensors are arranged at different positions, the method comprising the steps of:
    preliminarily grouping the temperature sensors into one or a plurality of predetermined attachment areas of the machine tool;
    respectively obtaining variations of detected temperatures by the plurality of temperature sensors belonging to the attachment areas;
    comparing each of the variations with a corresponding preset limit value; and
    determining the temperature sensors associated with the variation to be abnormal when one of the variations exceeds the limit value,
    wherein the attachment areas are divided into four areas: an area that is affected by heat sources and classified for each of the heat sources; an area that is not affected by the heat sources, is in or faces a machining space; an area that is not affected by heat sources, is not in or does not face a machining space and is proximate to a floor surface; and an area that is not affected by the heat sources, is not in or does not face the machining space, and is spaced away from the floor surface,
    wherein when a plurality of temperature sensors are in each of the classified areas, abnormalities of the temperature sensors in the each of the areas are detected.

4. The method for detecting abnormalities of temperature sensors in the machine tool according to claim 3, comprising a step of: prohibiting a correction of machining dimensional errors from being changed in thermal displacement correction of the machine tool, when the temperature sensors are determined abnormal.

5. A method for detecting abnormalities of a temperature sensor in a machine tool in which a plurality of temperature sensors are arranged at different positions, the method comprising the steps of:
    preliminarily grouping the temperature sensors into one or a plurality of predetermined attachment areas of the machine tool;
    respectively obtaining variations of detected temperatures by the plurality of temperature sensors belonging to the attachment areas;
    comparing each of the variations with a corresponding preset limit value; and
    determining the temperature sensors associated with the variation to be abnormal when one of the variations exceeds the limit value,
    wherein the each of the variation of detected temperatures is set equal to a difference between detected temperatures closest to each other when a plurality of temperature sensors in the same attachment area are sorted in descending or ascending order.

6. The method for detecting abnormalities of temperature sensors in the machine tool according to claim 5, comprising a step of: prohibiting a correction of machining dimensional errors from being changed in thermal displacement correction of the machine tool, when the temperature sensors are determined abnormal.

7. The method for detecting abnormalities of temperature sensors in the machine tool according to claim 5, wherein the attachment areas are divided into four areas: an area that is affected by heat sources and classified for each of the heat sources; an area that is not affected by the heat sources, is in or faces a machining space; an area that is not affected by the heat sources, is not in or does not face a machining space and is proximate to a floor surface; and an area that is not affected by the heat sources, is not in or does not face the machining space, and is spaced away from the floor surface, wherein when a plurality of temperature sensors are in each of the classified areas, abnormalities of the temperature sensors in the each of the areas are detected.

8. The method for detecting abnormalities of temperature sensors in the machine tool according to claim 7, comprising a step of: prohibiting a correction of machining dimensional errors from being changed in thermal displacement correction of the machine tool, when the temperature sensors are determined abnormal.

* * * * *